(12) United States Patent
Hörl et al.

(10) Patent No.: US 11,198,079 B2
(45) Date of Patent: Dec. 14, 2021

(54) FILTER MATERIAL AND FILTER ELEMENT PRODUCED THEREFROM

(71) Applicant: NEENAH GESSNER GMBH, Bruckmühl (DE)

(72) Inventors: Werner Hörl, Feldkirchen-Westerham (DE); Christoph Häringer, Halblech (DE); Andreas Demmel, Feldkirchen-Westerham (DE)

(73) Assignee: NEENAH GESSNER GmbH, Bruckmühl (DE)

( * ) Notice: Subject to any disclaimer, the term of this patent is extended or adjusted under 35 U.S.C. 154(b) by 259 days.

(21) Appl. No.: 16/064,149

(22) PCT Filed: Dec. 8, 2016

(86) PCT No.: PCT/EP2016/080304
§ 371 (c)(1),
(2) Date: Jun. 20, 2018

(87) PCT Pub. No.: WO2017/108436
PCT Pub. Date: Jun. 29, 2017

(65) Prior Publication Data
US 2018/0369730 A1    Dec. 27, 2018

(30) Foreign Application Priority Data
Dec. 23, 2015    (DE) .................... 10 2015 122 746.0

(51) Int. Cl.
*B01D 39/16*    (2006.01)
*B01D 39/18*    (2006.01)
*B01D 39/08*    (2006.01)

(52) U.S. Cl.
CPC ......... *B01D 39/1623* (2013.01); *B01D 39/08* (2013.01); *B01D 39/083* (2013.01);
(Continued)

(58) Field of Classification Search
None
See application file for complete search history.

(56) References Cited

U.S. PATENT DOCUMENTS 3,096,230 A    7/1963    Briggs
3,116,245 A *  12/1963   Mcnabb ................ B01D 29/111
                                                   210/508

(Continued)

FOREIGN PATENT DOCUMENTS

CN    1032492    4/1989
CN    1533343    9/2004
(Continued)

OTHER PUBLICATIONS

Office Action issued in CN Appln. No. 201680071114.2 dated Nov. 21, 2019 (English translation).
(Continued)

*Primary Examiner* — Jason M Greene
*Assistant Examiner* — Eric J McCullough
(74) *Attorney, Agent, or Firm* — Nixon & Vanderhye P.C.

(57) ABSTRACT

The invention relates to a filter material comprising a carrier material that is impregnated on one side with a thermally pre-crosslinked binder system (VB) and on the other side with a thermally crosslinkable but un-crosslinked binder system (UB). The filter material is characterised by improved deformability and a very good level of heat sealability, particularly using ultrasound, and a low pressure differential particularly when filtering high-viscosity liquids.

6 Claims, 2 Drawing Sheets

(52) U.S. Cl.
CPC ......... *B01D 39/1676* (2013.01); *B01D 39/18* (2013.01); *B01D 2239/0407* (2013.01); *B01D 2239/086* (2013.01); *B01D 2239/10* (2013.01)

(56) References Cited

U.S. PATENT DOCUMENTS

| | | | |
|---|---|---|---|
| 3,171,820 | A | 3/1965 | Volz |
| 3,692,618 | A | 9/1972 | Dorschner et al. |
| 3,802,817 | A | 4/1974 | Matsuki et al. |
| 3,855,046 | A | 12/1974 | Hansen et al. |
| 4,130,487 | A | 12/1978 | Hunter et al. |
| 4,340,563 | A | 7/1982 | Appel et al. |
| 4,983,193 | A | 1/1991 | Tani et al. |
| 2011/0290713 | A1* | 12/2011 | Horl ................ B01D 39/163 210/491 |
| 2018/0369730 | A1 | 12/2018 | Hörl et al. |

FOREIGN PATENT DOCUMENTS

| | | |
|---|---|---|
| CN | 102300614 | 12/2011 |
| DE | 601 435 | 8/1934 |
| DE | 1 504 551 | 5/1969 |
| DE | 41 26 126 | 2/1993 |
| DE | 10 2005 021 992 | 11/2006 |
| DE | 10 2009 006 586 | 6/2010 |
| DE | 10 2009 006 584 | 6/2011 |
| EP | 1 022 375 | 7/2000 |
| EP | 3 393 617 | 10/2018 |
| GB | 1111928 | 5/1968 |
| GB | 1 522 280 | 8/1978 |
| JP | 2012-516225 | 7/2012 |
| WO | WO 2006/119835 | 11/2006 |
| WO | WO 2010/085992 | 8/2010 |
| WO | WO 2014/072117 | 5/2014 |
| WO | WO 2017/108436 | 6/2017 |

OTHER PUBLICATIONS

International Search Report issued in PCT/EP2016/080304 dated Mar. 1, 2017.

International Preliminary Report on Patentability issued in PCT/EP2016/080304 dated Jun. 26, 2018.

* cited by examiner

FILTER MATERIAL AND FILTER ELEMENT PRODUCED THEREFROM

This application is the U.S. national phase of International Application No. PCT/EP2016/080304 filed Dec. 8, 2016, which designated the U.S. and claims priority to DE Patent Application No. 10 2015 122 746.0 filed Dec. 23, 2015, the entire contents of each of which are hereby incorporated by reference.

The invention relates to a filter material and to a filter element produced therefrom.

PRIOR ART

Filter materials often must withstand high mechanical stresses during use thereof in filter elements. In order to accommodate as large a filtration surface area as possible in the limited space of a filter housing, most filter materials are folded. The larger the filtration surface area, the longer the service life of a filter element and the lesser the pressure differential at a predetermined volumetric flow rate of the fluid to be filtered.

The service life or useful life of a filter element is the time that elapses during use of a filter element, from the time of installation to the time when a predetermined maximum differential pressure is reached. The larger the filtration surface area of the filter element and the better the dust-storage capacity of the filter medium on account of the surface texture thereof, the longer the service life. The pressure differential indicates the pressure difference that prevails upstream and downstream of the filter material when the fluid to be filtered flows through the filter material. The lesser the pressure differential, the greater the possibility of controlling the fluid flow rate at a predetermined pumping rate.

The larger the filtration surface area of a filter element, the better the service life and the pressure differential in a given filter material. In order to achieve as large a filtration surface area as possible, narrow and deep folds are sought. In order for the fold surfaces of two adjacent folds to not overlap, as far as is possible, when being at as small a distance as possible from one another, and thus not block valuable filtering surface area, either localised protuberances and/or indentations, so-called dimples, or waves extending in the longitudinal direction, so-called grooving, are made in the filter material by means of embossing. Grooving is described for example in DE 10 2005 021 992 A1 and dimpling is described in DE 41 26 126 A1.

In order for the folded filter material to also withstand high mechanical stresses, for example the hydraulic pressure during filtration of highly viscous liquids, the filter material must be as rigid as possible. For this purpose, the filter material is impregnated with a binder, which thermally cures after folding and embossing and thus produces a hard and rigid material. A material of this kind is described for example in DE 10 2009 006 586 A1 and in EP 1 022 375 A1. However, despite the already rather hard and rigid impregnation after curing, it is always the case, in particular when filtering highly viscous liquids, that the folds do not withstand the filtration pressure and are pressed against one another. This reduces the filtration surface area and often abruptly increases the pressure differential of the filter.

After folding and embossing the filter material, the two loose ends are often joined together in order to form a continuous bellows. The joining is carried out for example by means of adhesive bonding using a specially applied adhesive, by clamping together both ends using a metal clamp or by welding, preferably using ultrasound. In the case of welding, however, either the filter material must be impregnated with a thermoplastic binder, or a thermoplastic film is laid between the two surfaces to be welded. However, thermoplastic binders are generally not sufficiently rigid and the interposition of a thermoplastic film requires an additional working step.

The object of the invention is therefore to provide a filter material that is sufficiently robust when folded such that it can withstand the filtration pressure even of highly viscous liquids and the ends of which filter material can be thermally welded without thermoplastic polymers being additionally applied thereto or inserted therein. Furthermore, a filter element comprising a filter material of this kind is intended to be provided.

SUMMARY OF THE INVENTION

This object is achieved according to the invention by means of a filter material having the features of claim 1 and a filter element having the features of claim 5. Advantageous embodiments of the invention are described in the other claims.

The filter material according to the invention comprises a wet-laid nonwoven, a dry-laid nonwoven, a woven or a foam, the filter element being impregnated on a first side with a pre-crosslinked binder system and on the other, second side with a crosslinkable, but not yet crosslinked, binder system.

A filter material having improved deformability is provided by means of the invention, the thermal weldability thereof also being ensured. The filter material is distinguished by a very good heat sealability, in particular by means of ultrasound.

Filter elements which are produced from said filter material have a significantly lower initial pressure differential, in particular when filtering highly viscous liquids.

The expression "binder system" used in the context of the present invention is intended to imply that the binder may also comprise other additives, such as curing agents or accelerators.

Furthermore, it is noted that on account of the use of pre-crosslinked binder systems and crosslinkable, but not yet crosslinked, binder systems, filter materials can be provided which can be brought onto the market in this state, in order to then be optionally subjected to additional processing steps by the customer, such as folding, embossing or shaping to form particular filter elements. The final crosslinking of the binder systems can then take place after processing steps of this kind.

DETAILED DESCRIPTION OF THE INVENTION

The filter material according to the invention comprises an impregnated carrier material, selected from the group of wet-laid nonwovens, dry-laid nonwovens, wovens and foams.

Dry-laid staple fibre nonwovens consist of fibres having a finite length. In order to produce dry-laid staple fibre nonwovens, both natural and synthetic fibres can be used. Cellulose, wool, cotton and flax are examples of natural fibres. Polyolefin fibres, polyester fibres, polyamide fibres, polytetrafluoroethylene fibres and polyphenylene sulphide fibres are examples of synthetic fibres. The fibres used may be either straight or crimped. For the bonding, the air-laid staple fibre nonwoven may contain single- or multicomponent fusible binder fibres which melt completely or in part at a temperature below the melting temperature of the other fibres and bond the nonwoven. The air-laid staple fibre nonwovens are produced according to the known prior art, such as in the book "Vliesstoffe [Nonwovens], W. Albrecht, H. Fuchs, W. Kittelmann, Wiley-VCH, 2000". The dry-laid staple fibre nonwovens can be bonded by means of the already mentioned single- or multicomponent fusible binder fibres. Additional bonding options include, for example, needling, water-jet needling, or saturating or spraying the nonwoven with liquid binders and subsequent drying.

Melt-blown nonwovens consist of polymer continuous fibres. In order to produce the melt-blown nonwovens for the filter material according to the invention, the melt-blown process known in the art is used, as described in Van A. Wente, "Superfine Thermoplastic Fibers", Industrial Engineering Chemistry, vol. 48, pp. 1342-1346. Polyethylene terephthalate, polybutylene terephthalate, polyethylene naphthalate, polybutylene naphthalate, polyamide, polyphenylene sulphide and polyolefin, for example, are suitable polymers. The typical fibre diameters are in this case between 0.5 and 10 µm, preferably between 0.5 and 3 µm. Depending on requirements, additives, such as hydrophilising agents, hydrophobising agents, crystallisation accelerators or dyes, can be added to the polymers. Depending on requirements, the properties of the surface of the melt-blown nonwovens can be altered using surface treatment methods, such as corona treatment or plasma treatment. Moreover, if necessary, the melt-blown nonwovens can be compacted using a calender.

Spunbonded nonwovens also consist of polymer continuous fibres, the fibre diameter of which is, however, generally far greater than that of melt-blown fibres. Spunbonded nonwovens are produced according to the spunbonding method known in the art, as described in the patent documents U.S. Pat. No. 4,340,563A, U.S. Pat. No. 3,802,817A, U.S. Pat. No. 3,855,046A and U.S. Pat. No. 3,692,618A. Polyethylene terephthalate, polybutylene terephthalate, polyethylene naphthalate, polybutylene naphthalate, polyamide, polyphenylene sulphide and polyolefin, for example, are suitable polymers for the spunbonding method.

Foams are to be understood as all open-cell foams consisting of organic polymers. On account of their open-cell structure, they are permeable to air and are suitable for a wide range of filtering tasks. The production of suitable foams is described in the documents U.S. Pat. No. 3,171,820 A, DE 1504551 A, DE 601435 A and GB 1111928 A, for example.

Wet-laid nonwovens or papers within the meaning of this invention are all nonwovens that can be manufactured by means of the wet-laying processes known in the art for producing filter papers. The papers for the filter material according to the invention consist of natural, synthetic or inorganic fibres, or a mixture thereof. Cellulose, cotton, wool and hemp are examples of natural fibres, it being possible for the cellulose material used to be wood-free and/or woody celluloses from conifers and/or deciduous trees, regenerated celluloses and fibrillated celluloses. Glass fibres, basalt fibres, quartz fibres and metal fibres are examples of inorganic fibres. Polyester fibres, polypropylene fibres, multicomponent fibres having different melting points for the individual components, polyamide fibres and polyacrylonitrile fibres, for example, are suitable as synthetic fibres. The titre of the synthetic fibres is typically from 0.1 dtex to 8.0 dtex, preferably from 0.5 dtex to 5 dtex and the cutting length is typically from 3 mm to 20 mm, preferably from 4 mm to 12 mm. The papers for the filter material according to the invention may consist of 100% natural, synthetic or inorganic fibres, but any desired mixture of said fibre types is also possible. The paper sheet may consist of a plurality of layers that are either produced in a paper machine comprising an appropriate headbox and merged or consist of individual paper webs that are joined together in a separate working step. The individual layers may be designed to have different properties.

Typically, the carrier materials are completely impregnated with the binder in a steeping bath, for example, and then dried. Complete impregnation has the advantage that all fibres are coated with the binder and are thus firmly joined together. As a result, the fibres and thus also the filter material are protected against attack from aggressive liquids. However, the binder also has a significant influence on the ongoing workability of the filter material and the optimal choice of binder is often not entirely simple. In order to produce folds that are as sharp and dimensionally stable as possible, rigid filter materials are of advantage. For this purpose, the filter material is usually saturated in thermally curable binders, such as phenol resin, epoxy resin, melamine-formaldehyde resin, dried and then completely or partially cured. Although filter materials produced in this manner can be folded very easily, they have the disadvantage that they are hardly plastically deformable. Embossing deep and stable dimples or waves, which are indeed very important for distancing the folds from one another, is possible only to a very limited extent. Thermal welding of the loose ends for producing a continuous bellows is generally not possible with these filter materials either.

Plastically deformable and softer filter materials are obtained when using thermoplastic binders, for example. Acrylate, polyvinyl acetate and ethylene vinyl acetate dispersions, for example, are conventional thermoplastic binders. Said filter materials are easy to emboss and weld, but have the disadvantage that they do not produce dimensionally stable folds.

After exhaustive experiments, the inventors have now succeeded in producing a filter material which can be folded very easily and in a dimensionally stable manner, and can be embossed and thermally welded very easily and in a dimensionally stable manner.

The filter material according to the invention comprises a carrier material, which is impregnated on one side (first side) with a pre-crosslinked (precured) binder system and on the other side (second side) with a non-crosslinked (uncured), but also crosslinkable (curable), binder system. In this case, it is inconsequential whether the binder systems are thermally curable or cold-curing. A binder system can consist either of only one binder resin or of one or more binder resins having or not having curing agents and accelerators.

There are many possibilities for the composition of curable or curing binder systems to obtain faster or slower curing. Therefore, the following examples are only intended to describe the invention in greater detail and in no way limit the concept underlying the invention. An essential aspect of the invention is that a filter material is provided which is treated on one side with a binder system that is more strongly crosslinked than the binder system used on the opposite side, irrespective of the type of binder system in both cases.

Precured and uncured binder systems differ in terms of their reactivity. The precured binder systems consist, for example, of a binder resin, which is adjusted by means of accelerators, curing agents and/or catalysts such that said systems cure in part after impregnation and a first heat treatment step at a temperature of below 120° C. However, binder systems which cure in part without the influence of temperature are also conceivable, for example epoxy resin/curing agent systems. "Cured in part" means that 30% to 80% of the theoretically possible final curing has been achieved.

In the case of uncured binder systems, accelerators and catalysts are largely dispensed with. Said binders are adjusted by means of a suitably chosen curing agent such that they are largely uncured after a first heat treatment step at a temperature of below 120° C. "Largely uncured" means that at most 30% of the theoretically possible final curing has been achieved. This degree of curing can be achieved in specific binder resin systems, such as epoxy resin/curing agent systems, even without the influence of temperature.

Phenol resins, epoxy resins, melamine-formaldehyde resins, urea-formaldehyde resins, acrylate resins, polyvinyl acetate resins, ethylene vinyl acetate resins or mixtures thereof, for example, are suitable thermally curable binder resins both for precured and uncured applications. The binders are either in solid form, for example in the form of a powder, or in the form of solutions or dispersions in water or lower alcohols, for example.

Melamine-formaldehyde resins, urea-formaldehyde resins, resorcinol, diamines and difunctional organic acids, for example, are suitable curing agents.

Secondary amines, tertiary amines, organic acids, inorganic acids and latent acids, for example, are suitable accelerators.

Depending on requirement, various auxiliary substances, such as hydrophilising agents, hydrophobising agents, flame retardants or dyes, can be added to the binder systems.

The production of the filter material according to the invention comprises impregnation on both sides. In this case, one surface is impregnated with a first binder system and the second surface is impregnated with a second binder system. The two binder systems differ in terms of the degree of crosslinking thereof. The application of the first and second binder is, for example, controlled by the viscosity of the binder solution or by means of suitable method parameter settings, such that at least one of the two binder systems penetrates the filter material by at least half but at most three quarters of the thickness thereof. Preferably, each of the two binder systems penetrates the filter material by at least half but at most three quarters of the thickness thereof. Prior to impregnation with the second binder system, the first binder can be dried or melted and partially crosslinked. The second binder system is then dried or melted separately. However, it is also possible to dry or melt both binder systems together after application of the second binder system and in the process partially crosslink the first binder system.

The filter material according to the invention has a resin content of from 1 to 30%, preferably from 5 to 20%, after impregnation with the first binder system, and after impregnation with the second binder system, a total resin content of from 2 to 50%, preferably from 5 to 30%. The total resin content is the resin content of the first and second binder system together.

The percentages given in connection with the binder systems and resin content relate to the weight percent.

Double-sided roller application, double-sided spray application, double-sided application using a roll doctor or double-sided powder application, for example, are suitable methods for the double-sided impregnation.

If the filter material has a side that is denser and a side that is more open, as is the case for most filter papers, for example, the thermally pre-crosslinked binder system is preferably applied to the denser side.

A preferred embodiment of the filter material according to the invention is a paper made of natural fibres, synthetic fibres, inorganic fibres or mixtures thereof, which is impregnated on one side with a first binder system in such a way that the first binder system penetrates approximately two thirds of the paper thickness, and is impregnated on the opposite side with a second binder system in such a way that the second binder system also penetrates approximately two thirds of the paper thickness. Said filter material has a mass per unit area of from 50 $g/m^2$ to 400 $g/m^2$, preferably from 100 $g/m^2$ to 300 $g/m^2$, a thickness of from 0.1 mm to 2.0 mm, preferably from 0.3 mm to 1.5 mm, an air permeability of from 1 $l/m^2s$ to 1500 $l/m^2s$, preferably from 5$l/m^2s$ to 800$l/m^2s$, an impregnation agent content for the first binder system of from 1 to 30%, preferably from 5 to 20%, a total impregnation agent content of from 2% to 30%, preferably from 5% to 50%, an acetone extract for the uncured side of from 50 to 100%, preferably from 60 to 90%, and an acetone extract for the cured side of from 0 to 50%, preferably from 0 to 30%.

Within the scope of the invention, it is readily possible for the filter material according to the invention to consist of a plurality of layers or strata. Moreover, it is also possible for there to be one or more layers made of other materials upstream and/or downstream of the filter material according to the invention.

The paper impregnated according to the invention is embossed after impregnation. The embossing takes place preferably so as to form undulations in the longitudinal direction (grooving) or so as to form limited, planar indentations and/or protuberances (dimples). The embossed filter material is then folded, the fold lines preferably being transverse to the machine direction of the filter material. After a predetermined number of folds, the folded filter material is separated from the remaining, not yet folded material, such that a loose bellows is produced. In another working step, the loose ends of the bellows are then laid one on top of the other in such a way that the two surfaces rest one on top of the other on the non-precured binder system side. By means of thermal action, preferably using ultrasound, said surfaces are then welded together and a continuous bellows is produced.

For the final bonding, the continuous bellows made of the filter material according to the invention is then heat-treated at 130 to 220° C. for 1 to 20 minutes, both the precured and uncured binder system being completely cured. "Completely cured" means that the acetone extract of the cured filter material is at most 4%. The result is a filter material that withstands the filtration pressures, which arise particularly when filtering highly viscous liquids, extremely well.

Testing Methods

Mass per unit area according to DIN EN ISO 536 Thickness according to DIN EN ISO 534 Air permeability according to DIN EN ISO 9237 at 200 Pa pressure differential Initial pressure differential according to DIN ISO 4548/1, measured for a motor oil having a viscosity of 300 cSt and a volumetric flow rate of 40 l/min or for a motor oil having a viscosity of 2900 cSt and a volumetric flow rate of 4 l/min.

The proportion of impregnation agent in a paper is calculated using the following formula:

Impregnation agent content in %=(MPUA imp./MPUA paper)*100% in which MPUA imp.=mass of the dry impregnation agent per $m^2$ of paper
MPUA paper=mass per unit area of the impregnated paper
Acetone Extract The impregnated filter material is conditioned for 24 hours in standard conditions (23° C., 50% relative humidity). Approximately 2 g of the conditioned filter paper is weighed out using the analytical balance. Said sample is transferred into a Soxhlet apparatus and lixiviated for 2 hours using 300 ml acetone in reflux. Subsequently, the sample is dried for 10 minutes at 105° C. and conditioned for 24 hours in standard conditions. The conditioned sample is weighed again and the acetone extract is calculated from the weight difference using the following formula:

$$\text{Acetone extract in \%} = \frac{(MPUA \text{ not lixiviated} - MPUA \text{ lixiviated})}{MPUA \text{ not lixiviated}} \times 100$$

MPUA not lixiviated=Mass per unit area of the sample before lixiviation

MPUA lixiviated=Mass per unit area of the sample after lixiviation

Ultrasound Welding

The welding takes place using an HS dialog laboratory ultrasound welding device from Herrmann Ultraschall, active control, for 2 seconds at 1200 N contact pressure.

EXAMPLES

Example 1 (Comparative Example)

In accordance with the generally known method for manufacturing paper, a paper web consisting of 80% cellulose and 20% polyester fibres (1.7 dtex/6 mm) was produced in a paper machine. The paper produced in this manner had a mass per unit area of 168 g/m², a thickness of 0.94 mm, and an air permeability of 500 l/m²s. Subsequently, said paper was impregnated with the resole resin Prefere 94 3193 P from Prefere (Erkner, Germany) by means of dual roller application on each side, and dried at 120° C. The impregnated paper had a mass per unit area of 213 g/m², a thickness of 0.94 mm, an air permeability of 488 l/m²s and an impregnation agent content of 27%.

The heat sealability was measured at this filter material by means of ultrasound. The filter material produced in this manner was processed into a commercially standard oil filter folded into the shape of a star, which oil filter required an initial pressure drop of less than 2.2 bar, measured according to ISO 4548/1 at a volumetric flow rate of 40 l/min of motor oil having a viscosity of 300 cSt. The initial pressure drop was determined at said oil filter under the specified conditions. The result is shown in Table 1.

Example 2 (Comparative Example)

The paper from Example 1 was impregnated with a binder system by means of dual roller application on each side and dried at 120° C. The binder system consisted of 94 wt. % of the resole resin Prefere 94 3193 P from Prefere (Erkner, Germany) and 6 wt. % resorcinol. The binder system was adjusted to a pH of 8 using diethanolamine. The impregnated paper had a mass per unit area of 211 g/m², a thickness of 0.92 mm, an air permeability of 484 l/m²s and an impregnation agent content of 27%.

The heat sealability was measured at said filter material by means of ultrasound. The filter material produced in this manner was processed into a commercially standard oil filter folded into the shape of a star, which oil filter required an initial pressure drop of less than 2.2 bar, measured according to ISO 4548/1 at a volumetric flow rate of 40 l/min of motor oil having a viscosity of 300 cSt. The initial pressure drop was determined at said oil filter under the specified conditions. The result is shown in Table 1.

Example 3 (Invention)

The paper from Example 1 was impregnated with the resole resin Prefere 94 3193 P from Prefere (Erkner, Germany) by means of dual roller application on one side and on the opposite side with the binder system from Example 2. The paper impregnated in this manner was dried at 120° C. The impregnated paper had a mass per unit area of 212 g/m², a thickness of 0.93 mm and an air permeability of 480 l/m²s. The impregnation agent content of the pure resole resin was 14% and that of the binder system was also 14%. Both the pure resole resin and the binder system penetrated into the paper by up to one half of the paper thickness in each case.

The heat sealability was measured at said filter material by means of ultrasound. The filter material produced in this manner was processed into a conventionally standard oil filter folded into the shape of a star, which oil filter required an initial pressure drop of less than 2.2 bar, measured according to ISO 4548/1 at a volumetric flow rate of 40 l/min of motor oil having a viscosity of 300 cSt. The initial pressure drop was determined at said oil filter under the specified conditions. The result is shown in Table 1.

TABLE 1

| | Example 1 (comparison) | Example 2 (comparison) | Example 3 (invention) |
|---|---|---|---|
| Initial pressure drop ISO 4548/1, 40 l/min, 300 cSt | 3.5 bar | 4.0 bar | 1.0 bar |
| Thermal weldability | good | poor | good |
| Coating of the sonotrode | heavy coating | no coating | no coating |

It is clear from the comparison of the three examples that the filter material according to the invention from Example 3 combines the advantage of the thermal weldability of Example 1 with a significantly lower initial pressure drop than in Examples 1 and 2. Additionally, in the case of the filter material according to the invention in Example 3, no coating of impregnation agent formed on the sonotrode, as is the case in Example 2.

The invention is described in the following in greater detail by way of example with reference to the drawings, in which.

Figure 1:
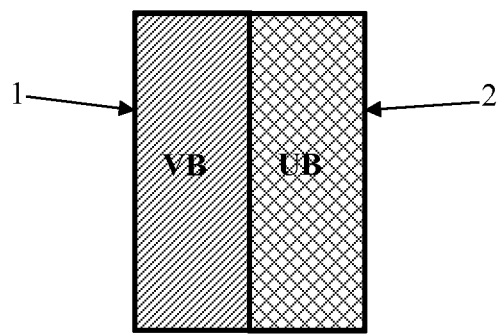
FIG. 1 is a schematic sectional view through a first embodiment of the filter material according to the invention.

FIG. 1 schematically shows a section through a first embodiment of the filter material according to the invention. A pre-crosslinked binder system VB penetrates the filter material from a first side 1 by 50% of the thickness thereof, while a non-crosslinked binder system UB also penetrates the filter material from a second side 2 by 50% of the thickness thereof.

Figure 2:
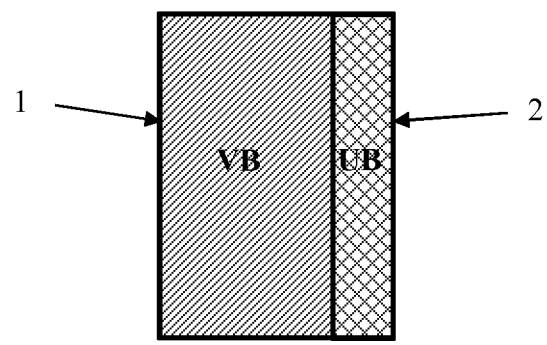
FIG. 2 is a schematic sectional view through a second embodiment of the filter material according to the invention.

FIG. 2 schematically shows a section through a second embodiment of the filter material according to the invention. The pre-crosslinked binder system VB penetrates the filter material from the first side 1 by 75% of the thickness thereof, while the non-crosslinked binder system UB penetrates the filter material from the second side 2 by 25% of the thickness thereof.

Figure 3:
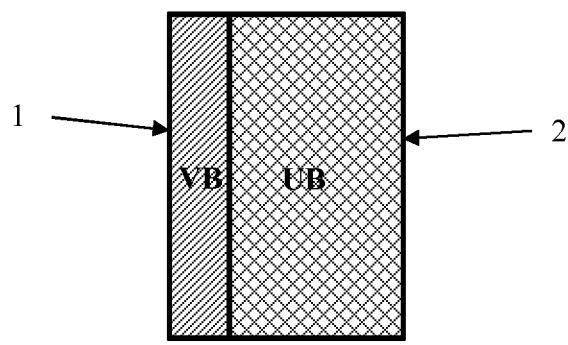
FIG. 3 is a schematic view through a third embodiment of the filter material according to the invention.

FIG. 3 schematically shows a section through a third embodiment of the filter material according to the invention. The pre-crosslinked binder system VB penetrates the filter material from a first side 1 by 25% of the thickness thereof, while the non-crosslinked binder system UB penetrates the filter material from the second side 2 by 75% of the thickness thereof.

Figure 4:
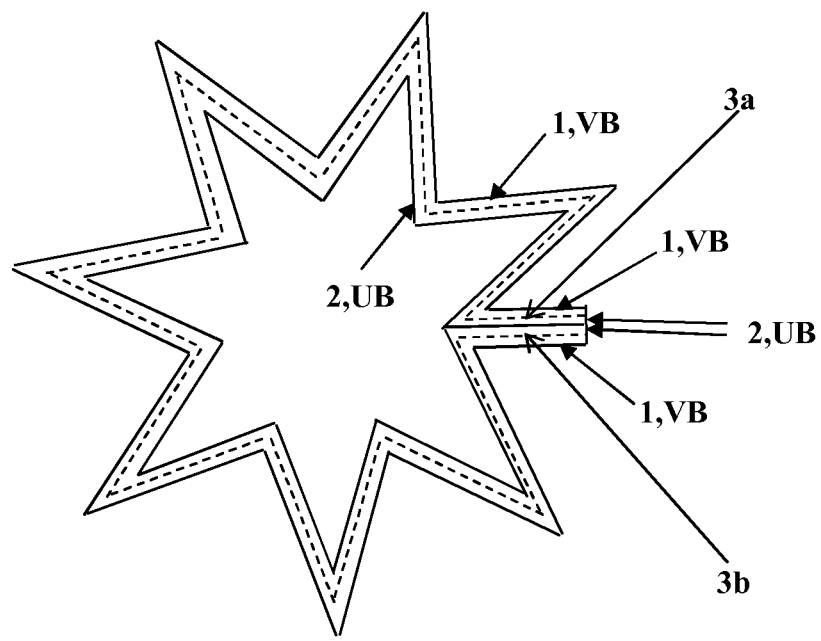
FIG. 4 is a plan view, vertically from above, of a first embodiment of a filter element folded into the shape of a star.

FIG. 4 is a plan view, vertically from above, of a first embodiment of a filter element folded into the shape of a star. A ring consisting of a filter material according to the invention folded from a zig-zag, for example the filter material shown in FIGS. 1 to 3, is closed, in that the second side 2 comprising the non-crosslinked binder system UB of one end of the ring, which forms a first connection region 3a, is placed on the second side 2 comprising the non-crosslinked binder system UB of the other end, which forms a second connection region 3b, and the two ends are joined together in a suitable manner, in particular by means of ultrasonic welding. In this embodiment, the second side 2 is on the inside of the filter element according to the invention. The connection regions 3a, 3b project laterally outwards beyond the star-shaped contour of the filter element.

Figure 5:
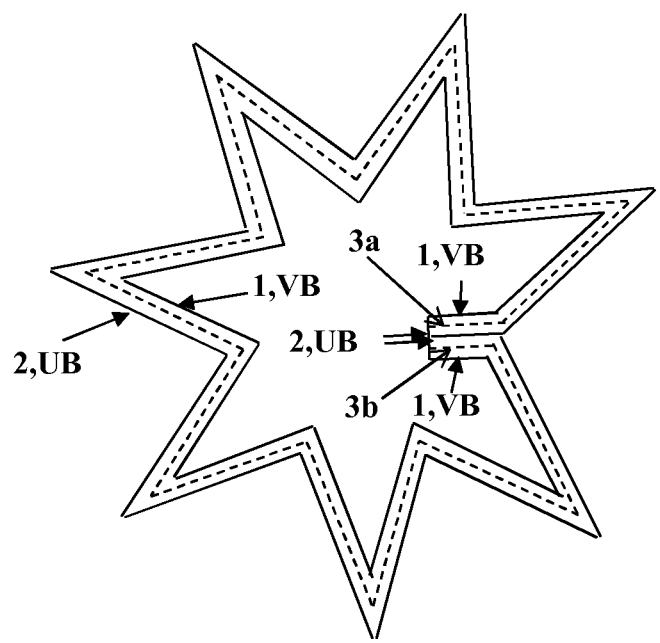
FIG. 5 is a plan view, vertically from above, of a second embodiment of a filter element folded into the shape of a star.

FIG. 5 is a plan view, vertically from above, of a second embodiment of a filter element folded into the shape of a star. The ring consisting of the filter material according to the invention is closed, in that the second side 2 comprising the non-crosslinked binder system UB of the first end of the ring, which forms the first connection region 3a, is placed on the second side 2 comprising the non-crosslinked binder system UB of the other end, which forms the second connection region 3b, and the two ends or connection regions are joined together in a suitable manner, in particular by means of ultrasonic welding. In this embodiment, the second side 2 is on the outside of the filter element according to the invention, the connection regions 3a, 3b projecting into the interior of the filter element.

The invention claimed is:

1. Filter material comprising a wet-laid nonwoven, a dry-laid nonwoven, a woven or a foam, the filter material having a first side and a second side, wherein
   the first side of the filter material is impregnated with a first binder system, and
   the second side of the filter material is impregnated with a second binder system,
   the first binder system is different than the second binder system,
   the first binder system is not present on the second side of the filter material,
   the second binder system is not present on the first side of the filter material,
   the first binder system is a pre-crosslinked binder system,
   the second binder system is a crosslinkable, but not yet or little crosslinked binder system,
   the pre-crosslinked binder system is thermally crosslinked to 30 to 80% of the theoretical final crosslinking thereof after a heat treatment step at below 120° C., and
   the crosslinkable, but not yet or little crosslinked binder system is thermally crosslinked to a maximum of 30% of the theoretical final crosslinking thereof after a heat treatment step at below 120° C.

2. Filter material according to claim 1, wherein at least one of the first and second binder systems penetrates the filter material by at least half and at most three quarters of the thickness thereof.

3. Filter material according to claim 1, wherein each of the first and second binder systems penetrates the filter material by at least half and at most three quarters of the thickness thereof.

4. Filter material according to claim 1, wherein the filter material has an acetone extract of from 50 to 100% on the non-crosslinked side and from 0 to 50% on the pre-crosslinked side.

5. Filter element comprising a filter material according to claim 1.

6. Filter element according to claim 5, wherein connection regions of the filter material are joined and thermally welded together in each case by the second side, which is impregnated with the not yet or little crosslinked binder system.

* * * * *